Patented June 26, 1951

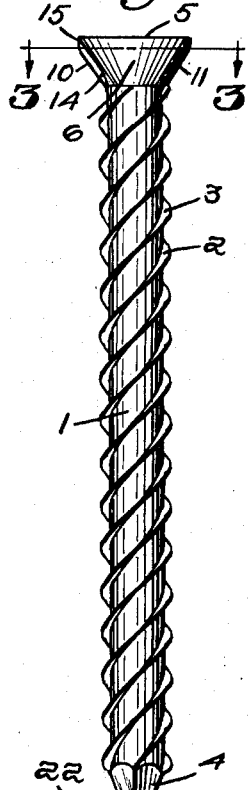
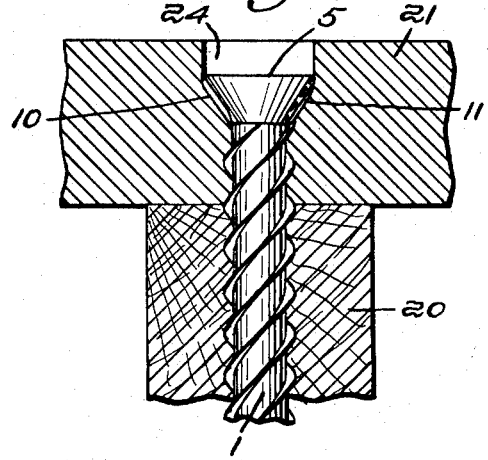
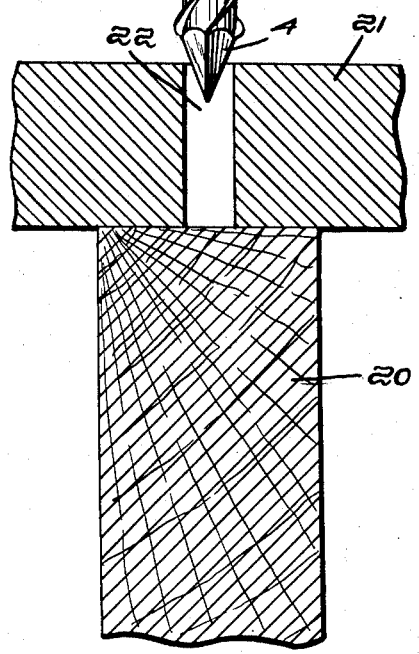
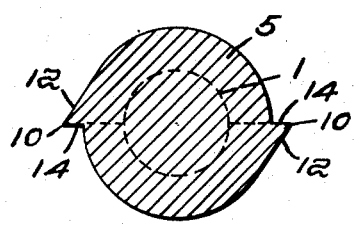

2,558,379

UNITED STATES PATENT OFFICE 2,558,379

SELF-LOCKING FASTENER

Harvey F. Phipard, Jr., South Dartmouth, Mass., assignor to Research Engineering & Manufacturing, Inc., New Bedford, Mass., a corporation of Massachusetts Application August 1, 1946, Serial No. 687,564

2 Claims. (Cl. 85—20)

My present invention is a novel and improved self-locking threaded headed fastener having self-locking devices associated with the head of the fastener. These self-locking devices are so constructed and arranged as to facilitate the rotation of the threaded portion of the fastener into the work during rotation in one direction and to automatically prevent a reverse turning. Thus, the threaded fastener is locked against loosening and is held in self-locking position at the extreme limit of being driven home in the work.

I am aware that various prior efforts have been made to form a headed screw fastener with some sort of locking notches, teeth, or the like; but such prior constructions have proved to be unsatisfactory in use. Where a plurality of notches or teeth are formed in the head or shank of the screw fastener, the rotation of the same tend to ream out the material in which the fastener is driven and, hence, prevents the self-locking action which it is desired to effect.

In my present invention I have developed a novel form of cam-shaped lug or wing associated with the head of the fastener and wherein, preferably, no more than two of such cam lugs or wings would be employed, thus preventing reaming out of the material as the lugs engage the same during the driving home or turning of the fastener into desired position.

My cam-locking construction is called into use only at the final driving-home action of the fastener, and has a substantially vertical face against reverse movement and is formed with its outer periphery substantially parallel with the bevel of the underneath part of the head on which it is formed. My fastener is of special value in securing fiber heads to wooden spools, said fasteners being known as bobbin screws; and with the diamond-shaped points having the edges of the diamond preferably merging into the threads, which are formed at an extreme pitch, I secure the benefit of the easily driven self-tapping screw construction, which require the advantageous feature of a self-locking device.

While primarily intended for a self-tapping and driven fastener, the cam-like wings can be utilized in any threaded fastener to insure a one-way turning and, hence, prevent unloosening and untwisting, and thus constitute a self-locking fastener.

Referring to the drawings illustrating preferred embodiments of the present invention, and particularly as embodied in a fastening of a fiber head to a wooden bobbin, which presents peculiarly difficult problems:

Fig. 1 is a longitudinal view of my fastener with a fiber top and bobbin into which it is to be driven, shown in cross-section;

Fig. 2 is a fragmentary view showing the fastener driven home with the two parts which it unites shown in cross-section;

Fig. 3 is an enlarged cross-sectional view on the line 3—3 of Fig. 1.

Referring to the drawings, I have illustrated a typical self-tapping fastener having a shank portion 1, with two or more threads formed thereon, two of such threads being herein shown designated at 2 and 3, said shank terminating at one end in a diamond point 4 and in a head 5 at the opposite end, said head being of greater diameter than the shank and with a bevelled underneath face 6, as is usual. The shank 1 may be itself tapered or cylindrical and the threads of any suitable pitch and height.

As herein illustrated, I form the threads with an extreme pitch and, preferably, form the same by a cold rolling process which solidifies, compacts, and strengthens the metal formed therein, and is further advantageous in a driven self-tapping fastener, giving a quick turning and easy driving.

On the bevelled surface of the head 5, I form one or more cam-shaped locking lugs, being herein illustrated as two in number, diametrically opposite each other and designated at 10 and 11. These lugs may be formed during the heading operation and each is provided with a cam-like face 12 blending into the bevelled face 6 in a line of rotation of the fastener so that during the rotation of the fastener when being driven, the cam face 12 will not seriously retard the rotation of the fastener.

On the opposite face of each lug, wing, or fastening element I form a flat or vertical face 14 extending substantially radially so that the two flat faces 14 are diametrically opposite and constitute locking elements against untwisting or unturning of the fastener after it is driven home. Each of these locking lugs 10 are preferably formed throughout the length of the bevelled face 6 of the head 5, although they may be formed in a portion only in said head, if desired.

Preferably, also, these locking lugs 10 are tapered at the upper or topmost end, as shown at 15, so that the lugs do not project beyond the extreme diameter of the head 5 itself. As shown in cross-section in Fig. 3, on the line 3—3 of Fig. 1, this cross-sectional view is slightly below the extreme diameter of the head 5 and, hence, illustrates the locking lugs 10 in full width or projection from the bevelled face 6.

While I may form any desired plurality of such locking lugs, I find that two are usually sufficient as these do not cut into the material thru which the head is driven and, hence, permit the material to "spring" in back of the lugs after the fastener has been turned or driven home, whereby the material into which the fastener is driven will automatically spring back and engage the flat surface 14, thus effecting the locking against untwisting.

My fastener may be formed with or without a socket or screw slot, and when designed for a driving self-tapping fastener only will have a flat top to the head 5, as is preferable in bobbin screws. As above mentioned, the fastening of rims to bobbins is a peculiarly difficult operation as the wooden bobbins have a relatively thin wall formed around the central hole, and the rims to be fastened therearound are of usually harder materials such as metal or fiber. Hence, driving a fastening screw thru the metal or fiber and into the relatively thin wood of the bobbin presented a peculiarly difficult operation. My fastener is of particular value in the use of same as a bobbin screw.

Again referring to the drawings, I have illustrated in enlarged view a fragmentary portion of a wooden bobbin 20 and a fiber rim 21. The fiber will be pre-bored, as shown at 22, which bore is of slightly less diameter than that of the shank 1 of the fastener to be utilized therewith. The fastener is then driven home, forming its own threads in the wood 20 of the bobbin and, hence, turning therein and forming its own countersink for the head 5, as indicated at 24, Fig. 2. As the fastener is driven into the fiber 21, the self-tapping threads will commence rotation of the fastener and will complete the turning and threading into the bobbin 20 until the fastener is finally driven home, as illustrated in Fig. 2; whereupon the cam-like locking wings, lugs, or elements 10 will automatically act to prevent unturning, loosening, or untwisting of the fastener, being impressed and indented into the material of the rim 1, which will spring in back of the flat faces 14 of each lug and which, thus, insures a one-way turning only of the fastener.

I claim:

1. A self-locking, self-tapping fastener of the kind described having a head formed with a tapered under surface at one end, a point at the other end, sharply inclined threads intermediate the head and point, the pitch of said threads being in the order of 45° so as to rotate said fastener through a plurality of revolutions upon application of longitudinal pressure to said fastener, a locking cam lug formed on the tapered under surface of said head and comprising an inclined portion facing in the direction of rotation and an adjacent oppositely facing radial locking face portion, said inclined portion merging with the normal diameter of the head and extending outwardly to said radial face, said radial face being substantially a parallelogram in form and area on the under side of the head only, whereby it is out of contact with the article to which the fastener is applied until the head is driven home.

2. A self-locking, self-tapping fastener of the kind described having a head formed with a tapered under surface at one end, a point at the other end, sharply inclined threads intermediate the head and point, the pitch of said threads being in the order of 45° so as to rotate said fastener through a plurality of revolutions upon application of longitudinal pressure to said fastener, a pair of locking cam lugs formed on the under surface of said head and each comprising an inclined portion facing in the direction of rotation and an adjacent oppositely facing radial flat locking face portion, said inclined portion merging tangentially with the normal diameter of the head and extending outwardly to said radial face, said radial face being substantially a parallelogram in form and with the outer line of said parallelogram parallel with the under face of the head.

HARVEY F. PHIPARD, Jr.

REFERENCES CITED

The following references are of record in the file of this patent:

UNITED STATES PATENTS

| Number | Name | Date |
|---|---|---|
| 42,475 | Harvey | Apr. 26, 1864 |
| 452,548 | Nettlefold et al. | May 19, 1891 |
| 735,336 | Bowles | Aug. 4, 1903 |
| 1,506,500 | Ripamonti et al. | Aug. 26, 1924 |
| 2,037,586 | Olson | Apr. 14, 1936 |

FOREIGN PATENTS

| Number | Country | Date |
|---|---|---|
| 38,829 | Switzerland | Dec. 28, 1906 |
| 113,183 | Great Britain | Feb. 14, 1918 |
| 833,028 | France | Oct. 10, 1938 |